United States Patent
Cox, Jr. et al.

(10) Patent No.: US 7,243,255 B2
(45) Date of Patent: Jul. 10, 2007

(54) DESIGN OF INSTANTANEOUSLY RESTARTABLE CLOCKS AND THEIR USE SUCH AS IN CONNECTING CLOCKED SUBSYSTEMS USING CLOCKLESS SEQUENCING NETWORKS

(75) Inventors: Jerome R. Cox, Jr., St. Louis, MO (US); David Michael Zar, Maryland Heights, MO (US); George L. Engel, Maryville, IL (US)

(73) Assignee: Washington Universtiy, St. Louis, MO (US)

( * ) Notice: Subject to any disclaimer, the term of this patent is extended or adjusted under 35 U.S.C. 154(b) by 0 days.

(21) Appl. No.: 11/526,376

(22) Filed: Sep. 24, 2006

(65) Prior Publication Data

US 2007/0033429 A1    Feb. 8, 2007

Related U.S. Application Data (63) Continuation-in-part of application No. PCT/US2005/009990, filed on Mar. 24, 2005.

(60) Provisional application No. 60/556,388, filed on Mar. 25, 2004.

(51) Int. Cl.
   - G06F 1/04 (2006.01)
   - G06F 1/00 (2006.01)
   - G06F 1/12 (2006.01)

(52) U.S. Cl. ............ 713/600; 171/500; 171/503; 171/601

(58) Field of Classification Search ............ None
See application file for complete search history.

(56) References Cited

U.S. PATENT DOCUMENTS

| | | |
|---|---|---|
| 4,977,581 A | 12/1990 | Cerminara |
| 5,428,765 A | 6/1995 | Moore |
| 6,304,979 B1 | 10/2001 | Bacigalupo |

(Continued)

FOREIGN PATENT DOCUMENTS

WO    2005/094555 A2    10/2005

OTHER PUBLICATIONS

Shuo-Yuan Hsiao and Chung-Yu Wu, "A Parallel Structure for CMOS Four-Quadrant Analog Multipliers and Its Application to a 2-GHz RF Downconversion Mixer," IEEE Journal of Solid-State Circuits, vol. 33, No. 6, Jun. 1998, pp. 859-869.

(Continued)

*Primary Examiner*—James K. Trujillo
*Assistant Examiner*—Stefan Stoynov
(74) *Attorney, Agent, or Firm*—The Law Office of Kirk D. Williams (57) ABSTRACT

Disclosed are, inter alia, instantaneously restartable clocks and their use. For example, instantaneously restartable clocks can be used to receive data from another independently clocked subsystem in a manner that removes the possibility of metastability errors. A restartable clocking signal generator, relying on oscillating signals typically generated by a continuous oscillating source, is used to generate a restartable clocking signal which can be asynchronously restarted in response to one or more control signals. In one implementation, an apparatus includes multiple independently clocked subsystems and a clockless sequencing network, with the clockless sequencing network being used to initiate the start of a restartable clock in order to reliably receive and process data between the independently clocked subsystems.

25 Claims, 7 Drawing Sheets

IMPROVED RESTARTABLE CLOCK

U.S. PATENT DOCUMENTS

2002/0190774 A1  12/2002  Manganaro

OTHER PUBLICATIONS

Jerome R. Cox, Jr., "Can a Crystal Clock Be Started and Stopped?", Applied Mathematics Letters, vol. 1, Issue 1, 1988, pp. 37-40.

C. Mead and L. Conway, Introduction to VLSI Systems, Addison-Wesley, pp. 234-235 and pp. 258-259, 1980.

Jerome R. Cox, Jr. and David M. Zar, "Synthesis of Control Elements from Petri Net Models," WUSEAS-2005-43, Washington University, St. Louis, MO, Sep. 16, 2005.

**RESTARTABLE
CRYSTAL-BASED CLOCK**

**FIGURE 1
(PRIOR ART)**

IMPROVED RESTARTABLE CLOCK
FIGURE 2

DESIGN OF INSTANTANEOUSLY
RESTARTABLE CLOCKS AND THEIR USE
SUCH AS IN CONNECTING CLOCKED
SUBSYSTEMS USING CLOCKLESS
SEQUENCING NETWORKS

CROSS-REFERENCE TO RELATED
APPLICATIONS

This application is a continuation-in-part of prior copending PCT International Application No. PCT/US2005/009990, filed on Mar. 24, 2005, and designating the United States of America, which claims the benefit of U.S. Provisional Application No. 60/556,388, filed Mar. 25, 2004; with both of these applications being hereby incorporated by reference in their entirety.

TECHNICAL FIELD

One embodiment of the invention relates to communications and computer systems, especially computers, routers, packet switching systems, and other devices; and more particularly, one embodiment relates to restartable clocks including, but not limited to, crystal-based restartable clocks and the use of restartable clocks, such as, but not limited, for reliably communicating between entities and for reducing power consumption by turning off idle entities.

BACKGROUND

In the 1960's, it was discovered that it was not possible to make a device that transferred data perfectly between two independent clock domains. Although it was possible to make the probability of failure arbitrarily small, it was not possible to make the probability zero. Many attempts were made to design a perfect synchronizer (e.g., using a flip flop to attempt to produce a signal that never enters a metastable state when the receiving system latched the data), but they all had a flaw lurking somewhere. The news of this fundamental problem was slow to spread through the industry so many commercial computer systems were produced that suffered from synchronizer failures.

Mead and Conway in the 1980 text, "Introduction to VLSI Systems," describe ring oscillators or delay-based clocks that can be started at an arbitrary instant and interface well with asynchronous systems (such as that illustrated on pages 235 and 258). Two subsystems with such clocks can carry out the transfer of data without the requirement for synchronization, and thus be free of any synchronizer failure. This is accomplished by an asynchronous layer between the two subsystems such that the two systems are no longer completely independent. However, delay-based clocks suffer from variations in their periods as a result of temperature changes, process differences and noise. These variations led to worst case designs that run much slower than equivalent crystal clock designs. Unfortunately, traditional crystal clocks cannot be started at an arbitrary instant in time. Thus, this approach to interfacing asynchronous and synchronous system never gained favor.

In 1988, one of the inventors of this present patent application, designed a crystal clock that could be started and stopped using two multipliers carrying out a fundamental trigonometric identity, which was described in the published paper: Jerome R. Cox, Jr., "Can a Crystal Clock be Started and Stopped?" *Applied Mathematics Letters*, Vol., 1, Pergamon, pp. 37-40, which is hereby incorporated by reference in its entirety. As described therein, a stoppable crystal clock can be based on the synthesis of a sinusoid of arbitrary phase from two sinusoids whose phases are separated by ninety degrees. A crystal oscillator can produce the waveforms of $\sin\omega t$ and $\cos\omega t$. If these waveforms are sampled at a time u, then a synthesized sinusoid s(t) with phase origin at time u can be obtained through use of the simple trigonometric identity:

$$s(t)=\cos\omega u \cdot \sin\omega t - \sin\omega u \cdot \cos\omega t = \sin(t-u)$$

A square clock signal can be produced from the sign, sgn(s(t)), of this waveform. The positive-going zero crossings of this waveform occur precisely at multiples of the crystal-clock period after the arbitrary time u.

Figure 1:
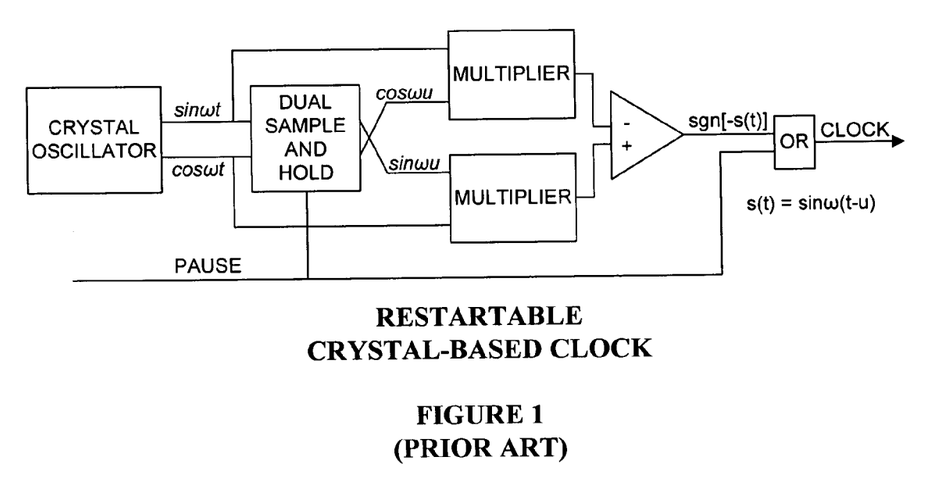
FIG. 1 is a block diagram of a prior art crystal-based, restartable clock.

The stoppable crystal clock illustrated in this paper is reproduced herein as FIG. 1. This stoppable crystal clock uses a dual sample and hold element and two multipliers, a comparator, and an OR gate to generate a clock signal in response to a control signal. When this control signal, called the pause signal, is asserted, the clock stops before the next zero crossing and starts it again immediately upon removal of the pause signal. Even today, the dual sample and hold element does not allow the clock to operate at speeds required of systems. As stated in the article, it was "not clear that this design is practical and useful," and "[p]erhaps as a result of the limited range of applications, or insignificant performance gains over delay-based stoppable clocks, crystal-based stoppable clocks may never find practical used." These statements apparently were true as there has been no known use or implementation of this design, despite the passing of approximately two and one half decades, and despite the great need in the computer and communications industries for a reliable restartable clock.

SUMMARY

Disclosed are, inter alia, instantaneously restartable clocks and their use such as in connecting clocked subsystems using clockless sequencing networks. For example, instantaneously restartable clocks can be used to receive data from another independently clocked subsystem in a manner that removes the possibility of metastability errors, while prior approaches often relied upon synchronizers which can be designed to make the possibility of metastability errors arbitrarily small but still greater than zero.

One embodiment comprises a restartable clock configured to instantaneously start generating and instantaneously cease generating a restartable clocking signal. The restartable clock includes: an oscillating source configured to continuously generate a plurality of oscillating signals regardless of whether or not the clocking signal is being generated; and a restartable clocking signal generator configured to generate the restartable clocking signal based on said oscillating signals and configured to asynchronously instantaneously restart in response to one or more control signals. The restartable clocking signal generator includes: a quadruple sample and hold element coupled to the oscillating source and configured to receive said oscillating signals and to generate captured oscillating signals; a plurality of four quadrant multipliers, coupled to the quadruple sample and hold element for receiving said captured oscillating signals and to the oscillating source for receiving said oscillating signals, configured to generate a plurality of sinusoidal signals; and differential circuitry, coupled to the plurality of four quadrant multipliers, being responsive to said control signals and configured to generate the restartable clocking signal based on the sinusoidal signals. In one embodiment, the oscillating source is crystal-based. In one embodiment, the oscillating source is not crystal-based.

One embodiment includes: a first synchronous subsystem whose operation is based on a clock signal generated by a restartable clock, the restartable clock being responsive to a plurality of oscillating signals generated by an oscillating source, the restartable clock including circuitry to instantaneously start and stop generating the clock signal; a second synchronous subsystem communicatively coupled to the first synchronous via a data path; wherein the second synchronous subsystem is independently clocked from the first synchronous subsystem; and an asynchronous sequencing network communicatively coupled between the first synchronous subsystem and the second synchronous subsystem, the asynchronous sequencing network including circuitry configured to be operatively responsive to the second synchronous subsystem in order to generate an external control signal indicating that data is to be communicated to the first synchronous subsystem; and wherein the first synchronous subsystem is configured to be responsive to the external control signal indicating data is to be communicated to the first synchronous subsystem, said responsiveness including restarting the restartable clock and synchronously receiving data over the data path from the second synchronous subsystem based on the clock signal generated by the restartable clock having been restarted in response to the external control signal indicating data is to be communicated to the first synchronous subsystem. In one embodiment, said received data is received by the first synchronous subsystem from the second synchronous subsystem without the use of a synchronizer.

One embodiment configured to process information includes: a restartable clock including an oscillating source continuously generating a plurality of oscillating signals, the restartable clock configured to generate a clocking signal and to be in a current state of a plurality of states, said states including a running state wherein the clocking signal includes one or more clocking pulses and a stopped state wherein the clocking signal does not include one or more clocking pulses, the current state of the restartable clock being selected in response to one or more control signals, wherein the continuous oscillating source continues to generate oscillating signals independently of the state of said restartable clock; a clock control interface, coupled to the restartable clock, and configured to generate said control signals based on the current state of the restartable clock and one or more external signals, wherein the clock control interface is configured to cause said control signals to indicate that the restartable clock should be in the active state only if the restartable clock is confirmed to be in the stopped state; and a processing subsystem configured to process information in response to the clocking signal when the restartable clock is in the running state.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Disclosed are, inter alia, instantaneously restartable clocks and their use such as in connecting clocked subsystems using clockless sequencing networks, including that disclosed in PCT International Application No. PCT/US2005/009990, filed on Mar. 24, 2005, and in U.S. Provisional Application No. 60/556,338, filed Mar. 25, 2004, both of which are hereby incorporated by reference in their entirety.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, instantaneously restartable clocks and their use such as in connecting clocked subsystems using clockless sequencing networks. For example, instantaneously restartable clocks can be used to receive data from another independently clocked subsystem in a manner that removes the possibility of metastability errors, while prior approaches often relied upon synchronizers which can be designed to make the possibility of metastability errors arbitrarily small but still greater than zero.

One embodiment comprises a restartable clock configured to instantaneously start generating and instantaneously cease generating a restartable clocking signal. The restartable clock includes: an oscillating source configured to continuously generate a plurality of oscillating signals regardless of whether or not the clocking signal is being generated; and a restartable clocking signal generator configured to generate the restartable clocking signal based on said oscillating signals and configured to asynchronously instantaneously restart in response to one or more control signals. The restartable clocking signal generator includes: a quadruple sample and hold element coupled to the oscillating source and configured to receive said oscillating signals and to generate captured oscillating signals; a plurality of four quadrant multipliers, coupled to the quadruple sample and hold element for receiving said captured oscillating signals and to the oscillating source for receiving said oscillating signals, configured to generate a plurality of sinusoidal signals; and differential circuitry, coupled to the plurality of four quadrant multipliers, being responsive to said control signals and configured to generate the restartable clocking signal based on the sinusoidal signals.

In one embodiment, the restartable clocking signal generator is configured to instantaneously stop generating the restartable clocking signal in response to said control signals. In one embodiment, the apparatus includes: a first clocked domain including the restartable clock, a receiver whose operation is based on the restartable clocking signal, and a clock control interface; and a second independently clocked domain; and wherein the first clocked domain is configured to: receive an indication that data is ready to be received from the second independently clocked domain; to restart the restartable clock in response to said receipt of the indication that data is ready to be received from the second independently clocked domain and a confirmation that the restartable clock is currently stopped; and after said restarting the restartable clock, the receiver being configured to capture data based on the restartable clocking signal from the second independently clocked domain without the use of a synchronizer. In one embodiment, the restartable clock includes a rendezvous element configured to identify whether or not the restartable clock is currently stopped. In one embodiment, the first clocked domain is configured to stop the restartable clock after processing of said received data. In one embodiment, the indication that data is ready to be received from the second independently clocked domain is received via a clockless sequencing network disposed between the first clocked domain and the second independently clocked domain. In one embodiment, the apparatus includes a processing mechanism responsive to the restartable clocking signal; wherein the restartable clocking signal generator is configured to instantaneously stop generating the restartable clocking signal in response to said control signals; and wherein the processing mechanism is configured to cause, after processing of data, said control signals to indicate to the restartable clocking signal generator to stop generating the restartable clocking signal. In one embodiment, the apparatus includes: a first clocked domain including the restartable clock, a receiver whose operation is based on the restartable clocking signal, and a clock control interface; and a second independently clocked domain; and wherein the first clocked domain is configured to: receive an indication that data is ready to be received from the second independently clocked domain; to restart the restartable clock in response to said receipt of the indication that data is ready to be received from the second independently clocked domain and a confirmation that the restartable clock is currently stopped; and after said restarting the restartable clock, the receiver being configured to capture said data to be said processed based on the restartable clocking signal from the second independently clocked domain without the use of a synchronizer. In one embodiment, wherein the oscillating source is crystal-based. In one embodiment, the oscillating source is not crystal-based.

One embodiment includes: a first synchronous subsystem whose operation is based on a clock signal generated by a restartable clock, the restartable clock being responsive to a plurality of oscillating signals generated by an oscillating source, the restartable clock including circuitry to instantaneously start and stop generating the clock signal; a second synchronous subsystem communicatively coupled to the first synchronous via a data path; wherein the second synchronous subsystem is independently clocked from the first synchronous subsystem; and an asynchronous sequencing network communicatively coupled between the first synchronous subsystem and the second synchronous subsystem, the asynchronous sequencing network including circuitry configured to be operatively responsive to the second synchronous subsystem in order to generate an external control signal indicating that data is to be communicated to the first synchronous subsystem; and wherein the first synchronous subsystem is configured to be responsive to the external control signal indicating data is to be communicated to the first synchronous subsystem, said responsiveness including restarting the restartable clock and synchronously receiving data over the data path from the second synchronous subsystem based on the clock signal generated by the restartable clock having been restarted in response to the external control signal indicating data is to be communicated to the first synchronous subsystem. In one embodiment, said received data is received by the first synchronous subsystem from the second synchronous subsystem without the use of a synchronizer.

In one embodiment, the oscillating source is configured to continuously generate the oscillating signal regardless of whether or not the clock signal is generated by the restartable clock. In one embodiment, the oscillating source is crystal-based. In one embodiment, the oscillating source is not crystal-based. In one embodiment, said received data is received by the first synchronous subsystem from the second synchronous subsystem without the use of a synchronizer. In one embodiment, the restartable clock includes: a quadruple sample and hold element coupled to the oscillating source and configured to receive said oscillating signals and to generate captured oscillating signals; a plurality of four quadrant multipliers, coupled to the quadruple sample and hold element for receiving said captured oscillating signals and to the oscillating source for receiving said oscillating signals, configured to generate a plurality of sinusoidal signals; and differential circuitry, coupled to the plurality of four quadrant multipliers, being responsive to said control signals and configured to generate the clock signal based on the sinusoidal signals. In one embodiment, the second synchronous subsystem includes a second restartable clock responsive to second control signals received from the asynchronous sequencing network in order to initiate the instantaneous restart of the second restartable clock for receiving data from the first synchronous subsystem without the use of a synchronizer.

One embodiment configured to process information includes: a restartable clock including an oscillating source continuously generating a plurality of oscillating signals, the restartable clock configured to generate a clocking signal and to be in a current state of a plurality of states, said states including a running state wherein the clocking signal includes one or more clocking pulses and a stopped state wherein the clocking signal does not include one or more clocking pulses, the current state of the restartable clock being selected in response to one or more control signals, wherein the continuous oscillating source continues to generate oscillating signals independently of the state of said restartable clock; a clock control interface, coupled to the restartable clock, and configured to generate said control signals based on the current state of the restartable clock and one or more external signals, wherein the clock control interface is configured to cause said control signals to indicate that the restartable clock should be in the active state only if the restartable clock is confirmed to be in the stopped state; and a processing subsystem configured to process information in response to the clocking signal when the restartable clock is in the running state.

In one embodiment, the clock control interface is configured to generate said control signals indicating the restartable clock should be in the stopped state in response to a stop signal indicating to stop the restartable clock. In one embodiment, the stop signal is received from the processing subsystem. In one embodiment, the clock control interface includes one or more set-reset flip-flops; wherein said control signals are produced in response to the state of said set-reset flip-flops, said state of said set-reset flip-flops being responsive to (a) said external signals indicating to start the restartable clock and (b) an indication that the restartable clock is in the stopped state. In one embodiment, the restartable clock includes: a quadruple sample and hold element coupled to the oscillating source and configured to receive said oscillating signals and to generate captured oscillating signals; a plurality of four quadrant multipliers, coupled to the quadruple sample and hold element for receiving said captured oscillating signals and to the oscillating source for receiving said oscillating signals, configured to generate a plurality of sinusoidal signals; and differential circuitry, coupled to the plurality of four quadrant multipliers, being responsive to said control signals and configured to generate the clocking signal based on the sinusoidal signals. In one embodiment, said external signals are received from a sequencing network including a plurality of control elements using transition signaling. One embodiment includes means for generating an acknowledgment that the restartable clock has been restarted. In one embodiment, the clock control interface includes a rendezvous element configured to identify whether or not the restartable clock is in the stopped state.

One embodiment includes a crystal-based oscillating source for generating multiple oscillating signals. A restartable clocking signal generator is used to generate a restartable clocking signal based on these oscillating signals and to asynchronously restart in response to one or more control signals. The restartable clocking signal generator of one embodiment includes a quadruple sample and hold element coupled to the crystal-based oscillating source and configured to receive the oscillating signals, one or more multipliers coupled to the quadruple sample and hold element and to the crystal-based oscillating source, and differential circuitry, coupled to the multipliers and responsive to the control signals, for generating the restartable clocking signal. In one embodiment, a single crystal-based oscillating source is used to provide oscillating signals to multiple independent restartable clocks. In one embodiment, an apparatus includes multiple subsystems and a sequencing network, which is used as a control interface between a first subsystem using a restartable clock and a second subsystem.

In one embodiment, the restartable clocking mechanism is configured to stop generating the restartable clocking signal in response to the control signals. In one embodiment, the apparatus includes a receiver configured to receive data in response to the restartable clocking signal being restarted by the restartable clocking signal generator. In one embodiment, the apparatus includes a processing mechanism responsive to the restartable clocking signal and configured to receive data and perform processing operations; wherein the restartable clocking mechanism is configured to stop generating the restartable clocking signal in response to the control signals; and wherein the processing mechanism is configured to cause the control signals to indicate to the restartable clocking mechanism to stop generating the restartable clocking signal. In one embodiment, the processing mechanism is configured to receive data in response to the restartable clocking signal being restarted by the restartable clocking signal generator and to perform the causing of the control signals to indicate to the restartable clocking mechanism to stop generating the restartable clocking signal in response to completion of the processing. In one embodiment, the apparatus includes a processing mechanism responsive to the restartable clocking signal and configured to perform processing operations; wherein the restartable clocking mechanism is configured to stop generating the restartable clocking signal in response to the control signals; and wherein the processing mechanism is configured to cause the control signals to indicate to the restartable clocking mechanism to stop generating the restartable clocking signal in response to completion of the processing operations.

One embodiment includes a crystal-based oscillating source, a first processing subsystem, and a second processing subsystem. The crystal-based oscillating source is configured to generate one or more oscillating signals. The first processing subsystem is coupled to the crystal-based oscillating source and configured to be responsive to a first restartable clocking signal of a first restartable clock, with the first restartable clock being configured to generate the first restartable clocking signal based on the oscillating signals and configured to restart in response to one or more first control signals. The second processing subsystem is coupled to the crystal-based oscillating source and configured to be responsive to a second restartable clocking signal of a second restartable clock, with the second restartable clock configured to generate the second restartable clocking signal based on the oscillating signals and configured to restart in response to one or more second control signals.

In one embodiment, each of the first and second restartable clocks includes a sample and hold element coupled to receive the oscillating signals, one or more multipliers coupled to the sample and hold element and to the crystal-based oscillating source, and differential circuitry configured to generate the respective first or second restartable clocking signal, with the differential circuitry being coupled to the multipliers and responsive to the respective first or second restartable clocking signal. In one embodiment, each of the first and second restartable clocks is configured to stop generating its respective first or second restartable clocking signal in response to its respective first or second control signals. In one embodiment, each of the first and second restartable clocks is configured to cause its respective first or second control signals to indicate to its respective first or second restartable clock to stop generating its respective restartable first or second clocking signal.

One embodiment includes a sequencing network coupled to the first and second processing subsystems, with the sequencing network being configured to generate the first and second control signals. In one embodiment, the first restartable clock is configured to stop in response the first control signals and the second restartable clock is configured to stop in response to the second control signals. In one embodiment, each of the first and second processing subsystems includes means for generating an acknowledgment signal that its respective first or second restartable clock has been restarted. In one embodiment, the acknowledgment signals are received by the sequencing network; and wherein each of the first and second processing subsystems respectively perform the generation of the first or second control signals based on at least one of the acknowledgment signals.

One embodiment includes a restartable clock, a clock control interface, and a processing subsystem. The restartable clock includes a crystal-based oscillating source, and is configured to generate a clocking signal and to be in a current state of multiple states including a running state wherein the clocking signal includes one or more clocking pulses and a stopped state wherein the clocking signal does not include one or more clocking pulses, with the current state of the restartable clock being selected in response to one or more control signals. The clock control interface is coupled to the restartable clock and configured to generate the control signals based on the current state of the restartable clock and one or more external signals. The processing subsystem is configured to process information in response to the clocking signal when the restartable clock is in the running state.

In one embodiment, the clock control interface is configured to generate the control signals to indicate that the restartable clock should be in the active state in response to the restartable clock being in the stopped state and the external signals indicating to start the restartable clock. In one embodiment, the clock control interface will only generate the control signals to indicate that the restartable clock should be in the active state when the restartable clock is in the stopped state. In one embodiment, the clock control interface is configured to generate the control signals indicating the restartable clock should be in the stopped state in response to a stop signal indicating to stop the restartable clock. In one embodiment, the stop signal is received from the processing subsystem. In one embodiment, the clock control interface includes one or more set-reset flipflops; wherein the control signals are produced in response to the state of the set-reset flipflops, the state of the set-reset flipflops being responsive to (a) the external signals indicating to stop the restartable clock and (b) an indication that the restartable clock is in the stopped state and the external signals indicating to start the restartable clock. In one embodiment, the restartable clock includes a sample and hold element coupled using differential signaling to the crystal-based oscillating source, multiple multipliers coupled using differential signaling to the sample and hold element and to the crystal-based oscillating source, and a comparator coupled to the multipliers. In one embodiment, the restartable crystal-based clock includes a quadruple sample and hold element coupled to the crystal-based oscillating source, multiple four quadrant multipliers coupled to the quadruple sample and hold element and to the crystal-based oscillating source, and a comparator coupled to the four quadrant multipliers. In one embodiment, the external signals are received from a sequencing network. One embodiment includes means for generating an acknowledgment that the restartable clock has been restarted.

One embodiment includes a restartable clock configured to generate a clocking signal and to be in a current state of multiple states, with these states including a running state wherein the clocking signal includes one or more clocking pulses and a stopped state wherein the clocking signal does not include one or more clocking pulses. The current state of the restartable clock is selected in response to one or more control signals. A clock control interface is coupled to the restartable clock and configured to generate the control signals based on the current state of the restartable clock and one or more external control signals. One or more processing subsystems are configured to operate in response to the clocking signal when the restartable clock is in the running state. The processing subsystems are configured to be responsive to the external control signals to identify a type of processing to perform. In one embodiment, the external control signals are generated by a sequencing network coupled to the clock control interface.

One embodiment includes multiple processing subsystems and a sequencing network. The sequencing network is configured to generate one or more control signals to control the order of processing performed by the processing subsystems. The sequencing networking typically includes one or more control elements based on which the control signals are generated. Each particular processing subsystem of the processing subsystems includes one or more components and a restartable clock generating mechanism configured to generate a clocking signal coupled to the components, which are responsive to the clocking signal.

One embodiment includes one or more crystal-based oscillating sources, and each of the restartable clock generating mechanisms includes a quadruple sample and hold element coupled to one of the crystal-based oscillating sources, multiple four quadrant multipliers coupled to the quadruple sample and hold element and to one of the crystal-based oscillating sources, and a comparator coupled to the four quadrant multipliers. In one embodiment, the restartable clock generating mechanism of at least one of the processing subsystems is responsive to at least one of the control signals for starting and stopping the generation of the clocking signal. In one embodiment, the control signals indicate to the at least one of the processing subsystems which of multiple operations to perform.

Figure 2:
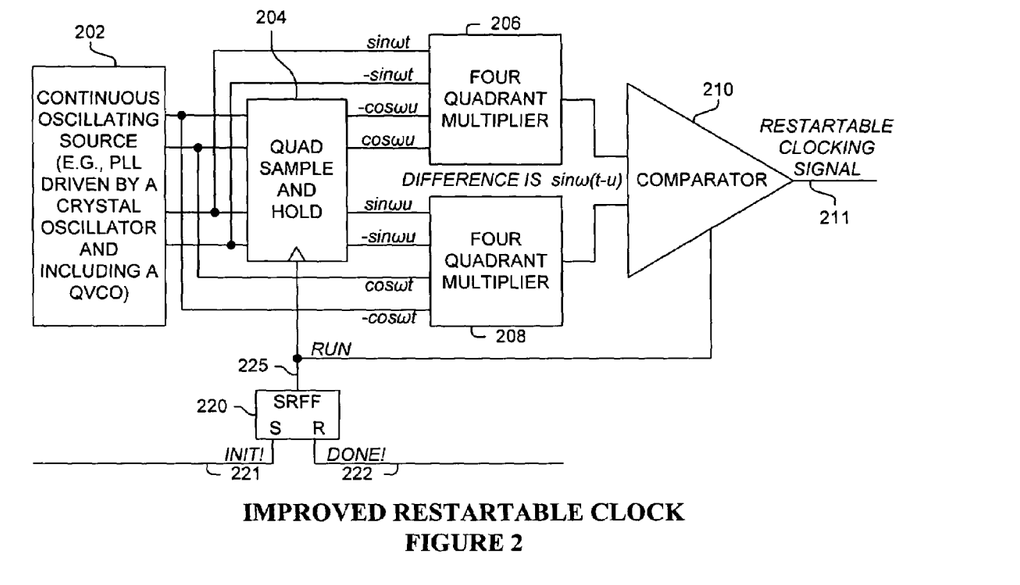
FIG. 2 is a block diagram of an improved restartable clock used in one embodiment.

Turning to the figures, FIG. 2 illustrates an improved instantaneously restartable clock 200 used in one embodiment. As shown, clock 200 includes a continuous oscillating source 202 for generating the four oscillating signals of $\cos\omega t$, $-\cos\omega t$, $\sin\omega t$, and $-\sin\omega t$. One embodiment generates these oscillating signals using a Phased-Locked Loop (PLL) including a quadrature voltage-controlled oscillator (QVCO) built using two voltage-controlled oscillators coupled in a manner so they oscillate in quadrature (i.e., at ninety degrees out of phase) in order to generate the desired four oscillating signals. In one embodiment, continuous oscillating source 202 uses a crystal in generating the oscillating signals; while in one embodiment, a different mechanism is used to generate the desired oscillating signals, such as, but not limited to, a non-crystal-based driving mechanism, such as, but not limited to, a PLL driven by a delay-based clock and including a QVCO to generate the desired oscillating signals, etc. Another example of a mechanism that can be used to generate the desired oscillating signals is a microelectromechanical systems (MEMs) oscillator.

Quadruple sample and hold element 204 captures a snapshot of these signals in response to run signal 225 changing to indicate that the restartable clock has transitioned to the running state from the stopped state. These captured oscillating signals provides a starting reference point for restartable clocking signal 211, which is generated by four quadrant multipliers 206 and 208 based on the captured values of the oscillating signals and the current values of the oscillating signals generated by continuous oscillating source 202. Comparator 210 (e.g., a comparator, differential clipping amplifier, differential circuitry, etc.) converts the sine wave to a square wave of the same frequency, and providing clipping functionality based on the state of run signal 225 prevents runt pulses. Note, many implementations of embodiments are possible for clock 200. For example, the two multipliers 206 and 208 could be replaced by a single shared multiplier.

Various implementations of a four quadrant multiplier can be used, such as that described in Shuo-Yuan Hsiao and Chung-Yu WU, "A Parallel Structure for CMOS Four-Quadrant Analog Multipliers and Its Application to a 2-GHz RF Downconversion Mixer," *IEEE Journal of Solid-State Circuits*, Vol. 33, No. 6, June 1998, which is hereby incorporated by reference in its entirety.

In one embodiment of restartable clock 200, SR flipflop 220 is used to maintain whether the state of restartable clock 200 is in the running or stopped state, and is responsive to INIT! signal 221 to go to the running state, and responsive to DONE! signal 222 to go to the stopped state.

Note, typically as used herein, signal names with the suffix '!' indicates pulse signaling is used in one embodiment and with the suffix '~' indicates transition signaling is used in one embodiment, while signal names with no suffix indicate levels. However, as one skilled in the art clearly understands, different types of signaling can be used for devices and it is easy to convert between types of signaling and/or a device which uses a different type of signaling can be substituted and/or adapted to work in place of another device to match other elements in a system.

Figure 3:
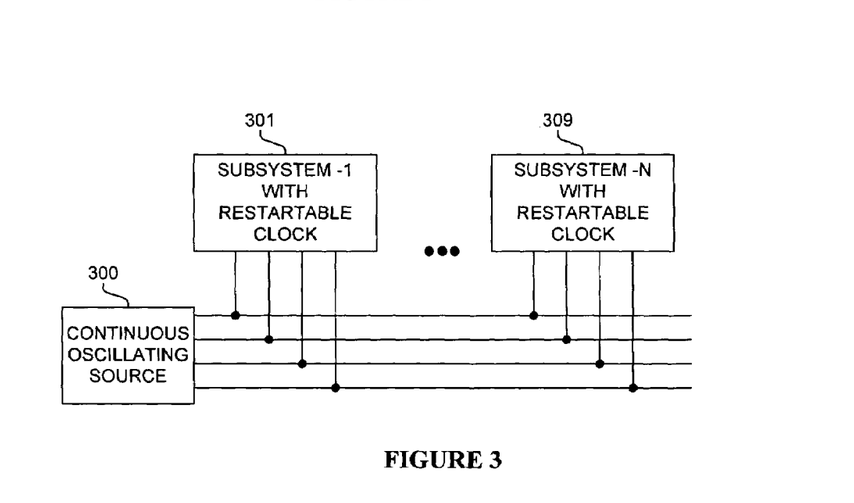
FIG. 3 is a block diagram illustrating that in one embodiment, multiple restartable clocks are driven off a single oscillating source.

FIG. 3 illustrates that in one embodiment, multiple restartable clocks 301-309 are driven off a continuous crystal or non-crystal based oscillating source 300. These multiple restartable clocks 301-309 may reside within a same chip or in multiple chips. Thus, for example, it is possible to route a master oscillating source signals from chip to chip, and from which, restartable clocks 301-309 can generate their respective clocking signals. Moreover, these master oscillating source signals can be inductively or conductively communicated to restartable clocks 301-309.

Also, in one embodiment restartable clocks can be started and stopped independently and at different times, and therefore, subsystems can be turned off when not in use to reduce power consumption. Also, in one embodiment, restartable clocks can be turned on randomly or in a controlled manner so as to control a maximum amount of power required at any given time.

Figure 4A:
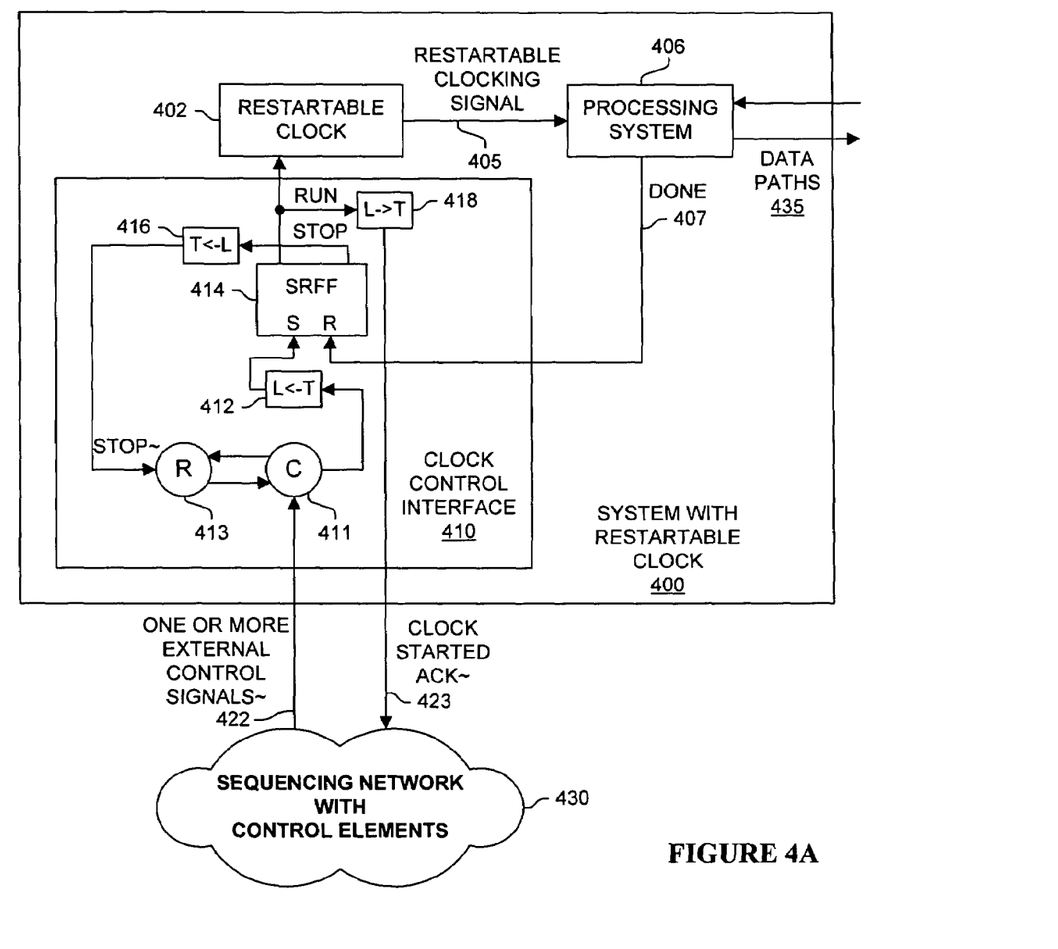
FIGS. 4A-B are each a block diagram of one embodiment of a system using a restartable clock with sequencing network control elements.

FIG. 4A is a block diagram of one embodiment of a system 400 using an instantaneously restartable clock 402 with sequencing network control elements 411 and 413 used to control the starting and stopping of restartable clock 402. In one embodiment, restartable clock 402 includes a crystal-based continuous oscillating source. In one embodiment, restartable clock 402 includes a non-crystal-based continuous oscillating source. In one embodiment, restartable clock 402 receives oscillating signals from an external oscillating source. In one embodiment, restartable clock 402 is a delay-based clock.

As shown, clock control interface 410 includes sequencing control elements 411 and 413 and SR flipflop (SRFF) 414, which are used to prevent restartable clock 402 from being restarted if it is already running.

Sequencing control elements are well-known in the art and therefore, all of them will not be listed nor described herein. A few references describing sequencing elements and sequencing network, which are hereby incorporated by reference in their entirety, are: W. A. Clark, "Macromodular Computer Systems," *Spring Joint Computer Conf.*, AFIPS Proceedings, Vol. 30, Thompson Books, Washington D.C. pp 335-336; S. M. Ornstein, M. J. Stucki and W. A. Clark, "A Functional Description of Macromodules," *Spring Joint Computer Conf.*, AFIPS Proceedings, Vol. 30, Books, Washington D.C. pp. 337-355; M. J. Stucki, S. M. Ornstein and W. A. Clark, "Logical Design of Macromodules," *Spring Joint Computer Conf.*, AFIPS Proceedings, Vol. 30, Thompson Books, Washington D.C. pp 357-364; and W. A. Clark and C. E. Molnar, "Macromodular Computer Systems," *Computers in Biomedical Research,* Vol. 4, R. Stacy and B. Waxman, Eds. Academic Press, New York, pp 45-85.

A sequencing network comprises or consists of the combination of multiple of these control elements/nodes distributed throughout a system and the interconnections of these nodes via control pathways. The structure of the sequencing network defines the order in which operations are carried out by the data processing subsystems. The sequencing network operates according to delay-insensitive design rules so that delay variations due to differences in fabrication technology, ambient temperature and component aging do not alter the correctness of the sequence of operations.

Sequencing networks that can be modeled by Petri nets have the additional advantage that through mathematical analysis and computer simulation they can be proved to always carry out the correct sequence of data processing operations. Thus, using sequencing networks in a system to control the operations of subsystems employing restartable clocks allows the correctness of behavior of the system to be analyzed, such as by using a Petri net model.

Figure 4B:
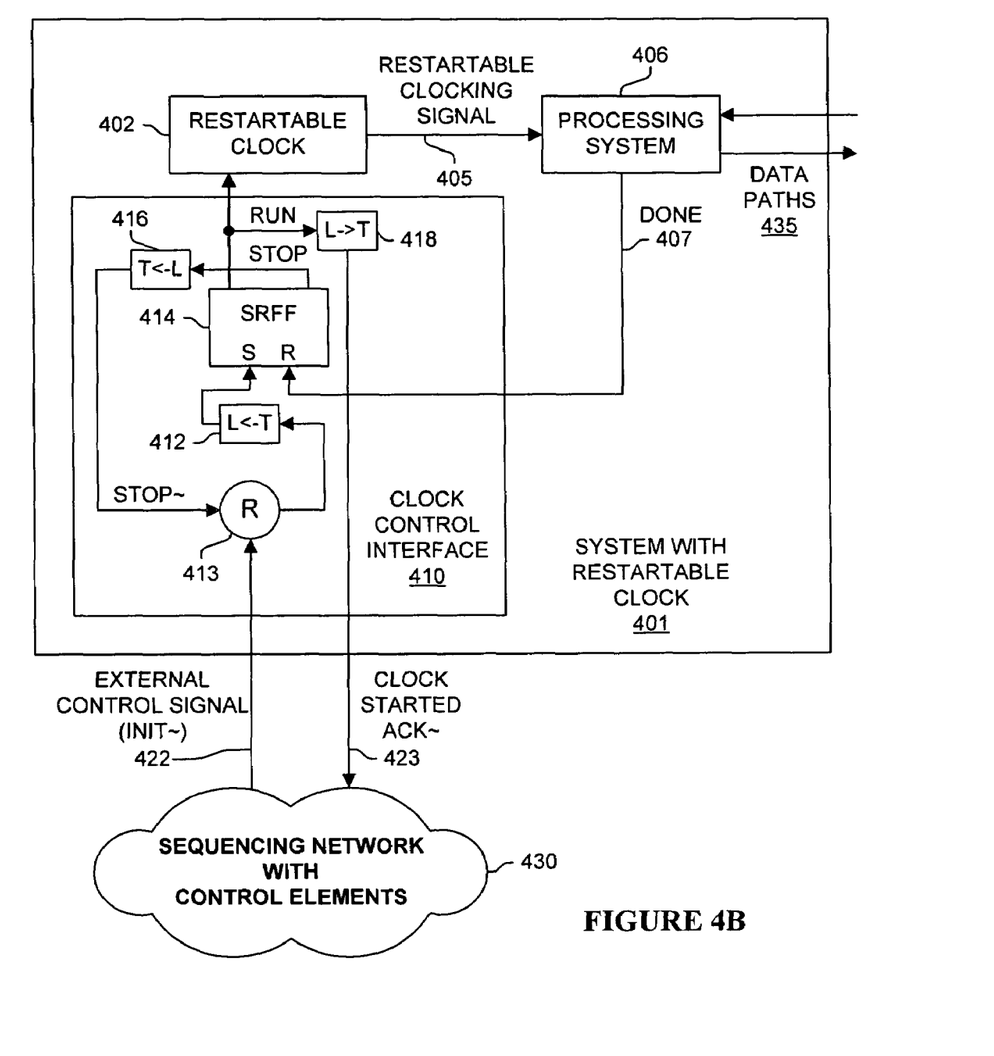

Note, as previously mentioned, some devices may use different types of signaling and it is easy to convert between types of signaling and/or a device which uses a different type of signaling can be substituted and/or adapted to work in place of another device to match other elements in a system. For example, each of FIGS. 4A and 4B shows signaling converting elements 412, 416, and 418. Elements 416 and 418 convert between level and transition signaling, which allows restartable clock 402 to receive level signaling, while rendezvous element (R) 413 and sequencing network with control elements 430 receive transition signaling; and element 412 converts from transition to level signaling to provide level signaling to SRFF 414 from transition signaling produced by call element (C) 411.

A few examples are described herein to illustrate a few of an unlimited number of configurations. For example, call element 411 can cause one or more flip-flops such as SRFF 414 to be set in response to one or more external control signals 421 indicating to start restartable clock 402. However, call element 411 will not signal to set SR flipflop 414 until it receives a signal from rendezvous element 413 indicating that restartable clock 402 is in the stopped state. Note, FIG. 4B illustrates a configuration which does not use a call element, and FIG. 5B illustrates the use of call and rendezvous elements with multiple flip-flops to individually track and acknowledge the starting and stopping of the restartable clock based on the source of the initiation signal to start the restartable clock.

Returning to the description of FIG. 4A, when restartable clock 402 is in the stopped state, call element 411 will set SR flipflop 414, which will cause restartable clock 402 to generate restartable clocking signal 405 (which is used by processing system 406 to perform processing and/or receive/send data over data paths 435) and will generate clock started acknowledgment signal 423 to sequencing network 430, e.g., for informing an external device that the clock has been started. Of course, there are many ways of generating clock started acknowledgment signal 423, such from restartable clocking signal 405 directly, or using circuitry such as a flip-flop to provide a level signal indicating whether or not restartable clock 402 is generating restartable clocking signal 405. When processing system 406 completes its processing, it generates done signal 407 to cause SR flipflop to reset, placing restartable clock into the stopped state. In response to the change in the output of SR flip flop 414, rendezvous element 413 will signal to call element 411 that it is free to restart restartable clock 402 (as restartable clock 402 is currently in the stopped state).

FIG. 4B is similar to the configuration illustrated in FIG. 4A, and illustrates one embodiment of a system with restartable clock 401 that is responsive to a single external control signal (INIT~), which uses rendezvous element 413 without a call element (as used in FIG. 4A).

Figure 5A:
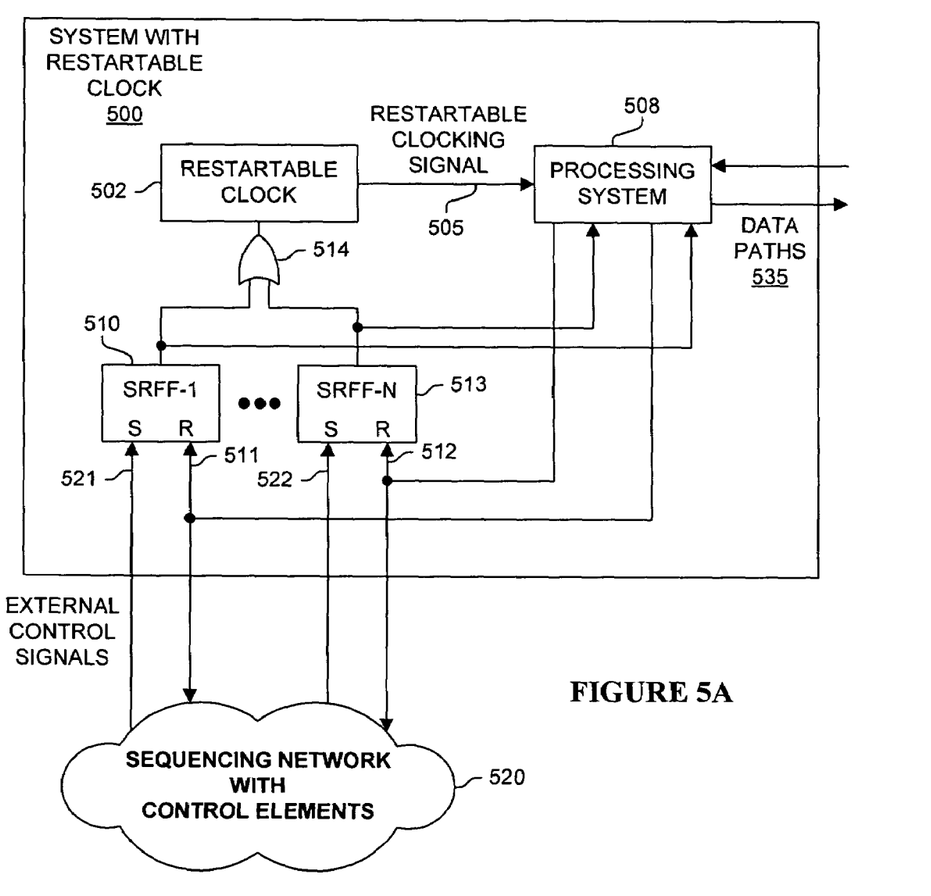
FIGS. 5A-B are each a block diagram of one embodiment including a system with a restartable clock and a sequencing network for generating control signals to which the system is responsive.
Figure 5B:
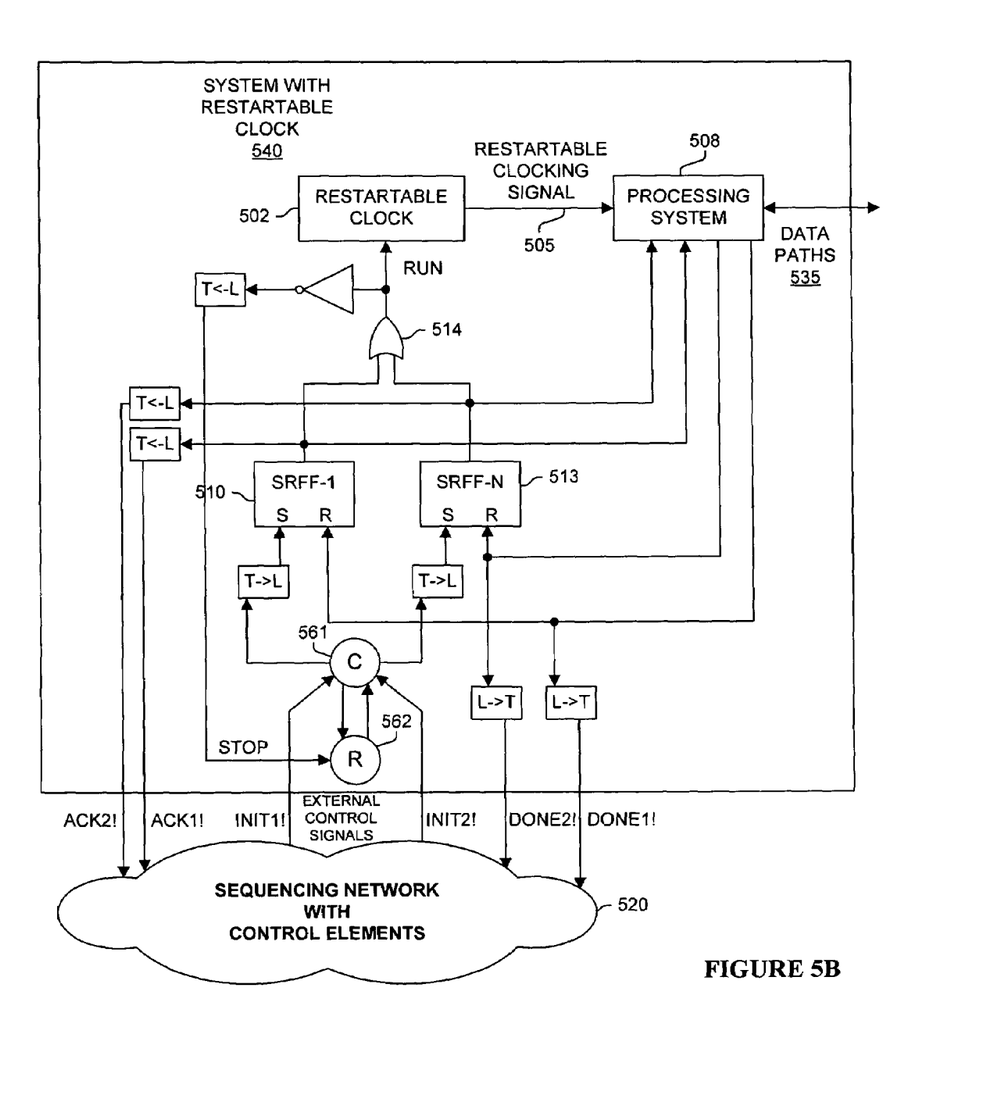

FIG. 5A illustrates one embodiment including a system 500 with a restartable clock 502 and a sequencing network 520 for generating control signals to which system 500 is responsive. In one embodiment, restartable clock 502 includes a crystal-based oscillating source. In one embodiment, restartable clock 502 receives oscillating signals from an external oscillating source, crystal or non-crystal based. In one embodiment, restartable clock 502 is a delay-based clock.

Sequencing network 520 is used to generate external control signals 521 and 522 which will cause restartable clock 502 to restart as well as provide to processing system 508 an indication of which selected operation to perform. In response to external control signals 521 or 522, the respective SR flip flop 510 or 513 is set, and from which OR gate 514 causes restartable clock 502 to be in the running state and generating restartable clocking signal 505, causing processing system 508 to operate. Based on the status of flipflops 510 and 513, processing system 508 performs its one or more tasks (e.g. receive data, process data, perform one or more operations, receive/send data over data paths 535, etc.), and then generates one or more signals (511, 512) typically when it is done with the respective task(s) in order to reset one or more of flipflops 511-513. If both flipflops 511 and 513 are reset, then restartable clock 502 is placed in the stopped state. Signals 511 and 512 are typically also provided to sequencing network 520.

Note, one embodiment also includes within system 500 sequencing control logic, such as that illustrated in FIG. 4, to ensure that sequencing network 520 does not attempt to restart restartable clock 502 when it is in the running state. (Of course, this functionality may be provided by sequencing network 520). Also, FIG. 5 illustrates two starting control elements 510 and 513 for illustrative purposes, while one embodiment includes more than two such elements. Also, one embodiment provides additional control signals and/or data lines to processing system 508.

FIG. 5B illustrates one embodiment including a system 540 with a restartable clock 502 and a sequencing network 520 for generating control signals to which system 540 is responsive. System 520 receives two sets of external control signals (INIT1!/ACK1!/DONE1!/INIT2!/ACK2!/DONE2!), and uses call element 561 and rendezvous element 562 (configured as illustrated in FIG. 4A) to control the starting and stopping of restartable clock 502 by providing appropriate signals to flip-flops 510 and 513. Note, an INIT! signal requests restartable clock 502 be restarted which is prevented from being restarted unless rendezvous element 562 is enabled based on the restartable clock being in the stopped (non-running) state; an ACK signal is used to signal the corresponding entity (1 or 2) that it caused the clock to start; and the DONE signal is generated by processing system 508 when a corresponding entity is completed and is used to stop restartable clock 502 and is typically signaled to sequencing network 520.

Figure 6:
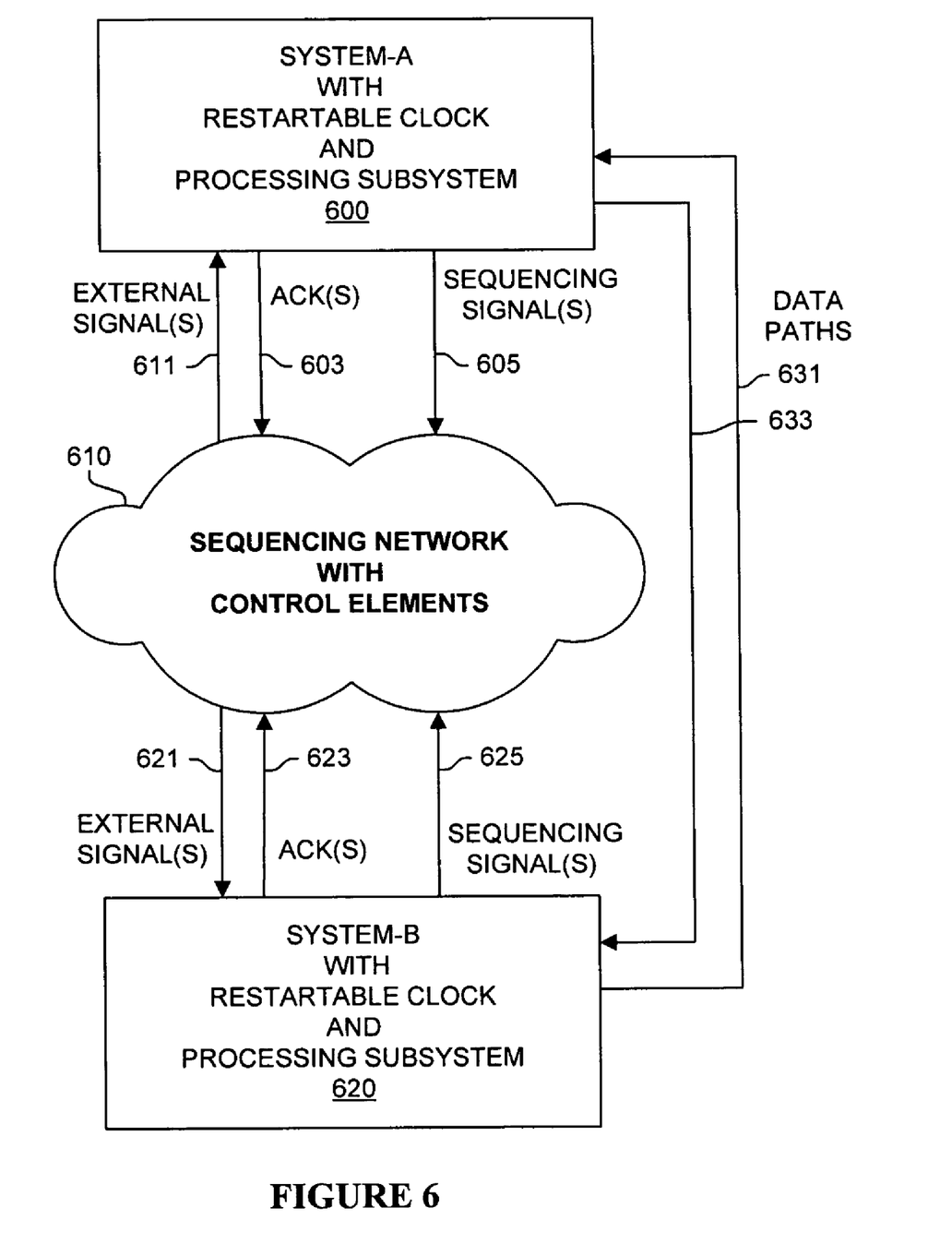
FIG. 6 is a block diagram of one embodiment including multiple systems with restartable clocks and a sequencing network for generating control signals to which these systems are responsive.

FIG. 6 is a block diagram of one embodiment including multiple systems 600 and 620 with restartable clocks and a sequencing network 610 for generating control signals 611 and 621 to which systems 600 and 620 are responsive, and with sequencing network 610 being responsive to sequencing signals 605 and 625 generated by systems 600 and 620. There are an unlimited number of variations and uses for the system illustrated in FIG. 6, and the operation of one such system is described.

Sequencing network 610, via external signals 611, causes the restartable clock of system 600 to start. In response, system 600 begins its work, including (for this example) placing data on the communication bus 633. System 600 then signals (605) to sequencing network 610 that it has completed its task and data are available for system 620. System 600 may have stopped its restartable clock, or system 600 may continue performing other tasks without stopping its restartable clock. Independent of these actions an acknowledgment signal may be transmitted to the sequencing network when the restartable clock 600 first starts and a stop signal transmitted to the sequencing network after the last clock pulse when the restartable clock of system 600 stops.

At this time, system 620 may be dormant with its restartable clock in the stopped state. Control network 610, in response to the received sequencing signals 605, informs the system 620 via external signal 621 that data are available for it to receive causing the restartable clock of system 620 to be restarted (which is acknowledged by signal 623). Alternatively, external signal 621 may change the state of an Interlock module so that system 620 is informed of the presence of data from system 600 as soon as system 620 enters the stopped state.

By restarting the clock after data are available (e.g., guaranteed not to be in a metastable condition), synchronization failure is prevented. The data are then received and processing continues; otherwise, system 620 may proceed with other tasks or go to a dormant state with its restartable clock stopped. System 620 can similarly communicate information to system 600 via communications bus 631 and signal to sequencing network 610 via sequencing signals 625. There are an unlimited number of variations possible, and an embodiment is typically designed to match the needs of its application.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. The invention as described herein contemplates all such embodiments as may come within the scope of the following claims and equivalents thereof.

What is claimed is:

1. An apparatus comprising a restartable clock configured to instantaneously start generating and instantaneously cease generating a restartable clocking signal, the restartable clock including:
   an oscillating source configured to continuously generate a plurality of oscillating signals regardless of whether or not the clocking signal is being generated; and
   a restartable clocking signal generator configured to generate the restartable clocking signal based on said oscillating signals and configured to asynchronously instantaneously restart in response to one or more control signals;

wherein the restartable clocking signal generator includes: a quadruple sample and hold element coupled to the oscillating source and configured to receive said oscillating signals and to generate captured oscillating signals; a plurality of four quadrant multipliers, coupled to the quadruple sample and hold element for receiving said captured oscillating signals and to the oscillating source for receiving said oscillating signals, configured to generate a plurality of sinusoidal signals; and differential circuitry, coupled to the plurality of four quadrant multipliers, being responsive to said control signals and configured to generate the restartable clocking signal based on the sinusoidal signals.

2. The apparatus of claim 1, wherein the restartable clocking signal generator is configured to instantaneously stop generating the restartable clocking signal in response to said control signals.

3. The apparatus of claim 1, wherein the apparatus includes: a first clocked domain including the restartable clock, a receiver whose operation is based on the restartable clocking signal, and a clock control interface; and a second independently clocked domain;
   wherein the first clocked domain is configured to: receive an indication that data is ready to be received from the second independently clocked domain; to restart the restartable clock in response to said receipt of the indication that data is ready to be received from the second independently clocked domain and a confirmation that the restartable clock is currently stopped; and after said restarting the restartable clock, the receiver being configured to capture data based on the restartable clocking signal from the second independently clocked domain without the use of a synchronizer.

4. The apparatus of claim 3, wherein the restartable clock includes a rendezvous element configured to identify whether or not the restartable clock is currently stopped.

5. The apparatus of claim 3, wherein the first clocked domain is configured to stop the restartable clock after processing of said received data.

6. The apparatus of claim 3, wherein the indication that data is ready to be received from the second independently clocked domain is received via a clockless sequencing network disposed between the first clocked domain and the second independently clocked domain.

7. The apparatus of claim 1, wherein the apparatus includes a processing mechanism responsive to the restartable clocking signal; wherein the restartable clocking signal generator is configured to instantaneously stop generating the restartable clocking signal in response to said control signals; and wherein the processing mechanism is configured to cause, after processing of data, said control signals to indicate to the restartable clocking signal generator to stop generating the restartable clocking signal.

8. The apparatus of claim 7, wherein the apparatus includes: a first clocked domain including the restartable clock, a receiver whose operation is based on the restartable clocking signal, and a clock control interface; and a second independently clocked domain;
   wherein the first clocked domain is configured to: receive an indication that data is ready to be received from the second independently clocked domain; to restart the restartable clock in response to said receipt of the indication that data is ready to be received from the second independently clocked domain and a confirmation that the restartable clock is currently stopped; and after said restarting the restartable clock, the receiver being configured to capture said data to be said processed based on the restartable clocking signal from the second independently clocked domain without the use of a synchronizer.

9. The apparatus of claim 1, wherein the oscillating source is crystal-based.

10. The apparatus of claim 1, wherein the oscillating source is not crystal-based.

11. An apparatus comprising:
a first synchronous subsystem whose operation is based on a clock signal generated by a restartable clock, the restartable clock being responsive to a plurality of oscillating signals generated by an oscillating source, the restartable clock including circuitry to instantaneously start and stop generating the clock signal;
a second synchronous subsystem communicatively coupled to the first synchronous via a data path; wherein the second synchronous subsystem is independently clocked from the first synchronous subsystem; and
an asynchronous sequencing network communicatively coupled between the first synchronous subsystem and the second synchronous subsystem, the asynchronous sequencing network including circuitry configured to be operatively responsive to the second synchronous subsystem in order to generate an external control signal indicating that data is to be communicated to the first synchronous subsystem;
wherein the first synchronous subsystem is configured to be responsive to the external control signal indicating data is to be communicated to the first synchronous subsystem, said responsiveness including restarting the restartable clock and synchronously receiving data over the data path from the second synchronous subsystem based on the clock signal generated by the restartable clock having been restarted in response to the external control signal indicating data is to be communicated to the first synchronous subsystem.

12. The apparatus of claim 11, wherein the oscillating source is configured to continuously generate the oscillating signal regardless of whether or not the clock signal is generated by the restartable clock.

13. The apparatus of claim 12, wherein the oscillating source is crystal-based.

14. The apparatus of claim 12, wherein the oscillating source is not crystal-based.

15. The apparatus of claim 11, wherein said received data is received by the first synchronous subsystem from the second synchronous subsystem without the use of a synchronizer.

16. The apparatus of claim 11, wherein the restartable clock includes: a quadruple sample and hold element coupled to the oscillating source and configured to receive said oscillating signals and to generate captured oscillating signals; a plurality of four quadrant multipliers, coupled to the quadruple sample and hold element for receiving said captured oscillating signals and to the oscillating source for receiving said oscillating signals, configured to generate a plurality of sinusoidal signals; and differential circuitry, coupled to the plurality of four quadrant multipliers, being responsive to said control signals and configured to generate the clock signal based on the sinusoidal signals.

17. The apparatus of claim 11, wherein the second synchronous subsystem includes a second restartable clock responsive to second control signals received from the asynchronous sequencing network in order to initiate the instantaneous restart of the second restartable clock for receiving data from the first synchronous subsystem without the use of a synchronizer.

18. An apparatus for processing information, the apparatus comprising:
a restartable clock including an oscillating source continuously generating a plurality of oscillating signals, the restartable clock configured to generate a clocking signal and to be in a current state of a plurality of states, said states including a running state wherein the clocking signal includes one or more clocking pulses and a stopped state wherein the clocking signal does not include one or more clocking pulses, the current state of the restartable clock being selected in response to one or more control signals, wherein the continuous oscillating source continues to generate oscillating signals independently of the state of said restartable clock;
a clock control interface, coupled to the restartable clock, and configured to generate said control signals based on the current state of the restartable clock and one or more external signals, wherein the clock control interface is configured to cause said control signals to indicate that the restartable clock should be in the running state only if the restartable clock is confirmed to be in the stopped state; and
a processing subsystem configured to process information in response to the clocking signal when the restartable clock is in the running state.

19. The apparatus of claim 18, wherein the clock control interface is configured to generate said control signals indicating the restartable clock should be in the stopped state in response to a stop signal indicating to stop the restartable clock.

20. The apparatus of claim 19, wherein the stop signal is received from the processing subsystem.

21. The apparatus of claim 19, wherein the clock control interface includes one or more set-reset flip-flops; wherein said control signals are produced in response to the state of said set-reset flip-flops, said state of said set-reset flip-flops being responsive to (a) said external signals indicating to start the restartable clock and (b) an indication that the restartable clock is in the stopped state.

22. The apparatus of claim 18, wherein the restartable clock includes: a quadruple sample and hold element coupled to the oscillating source and configured to receive said oscillating signals and to generate captured oscillating signals; a plurality of four quadrant multipliers, coupled to the quadruple sample and hold element for receiving said captured oscillating signals and to the oscillating source for receiving said oscillating signals, configured to generate a plurality of sinusoidal signals; and differential circuitry, coupled to the plurality of four quadrant multipliers, being responsive to said control signals and configured to generate the clocking signal based on the sinusoidal signals.

23. The apparatus of claim 18, wherein said external signals are received from a sequencing network including a plurality of control elements using transition signaling.

24. The apparatus of claim 23, including means for generating an acknowledgment that the restartable clock has been restarted.

25. The apparatus of claim 23, wherein the clock control interface includes a rendezvous element configured to identify whether or not the restartable clock is in the stopped state.

* * * * *